Feb. 17, 1925.
J. M. ALLEN
STORAGE BATTERY
Filed May 15, 1922
1,526,453
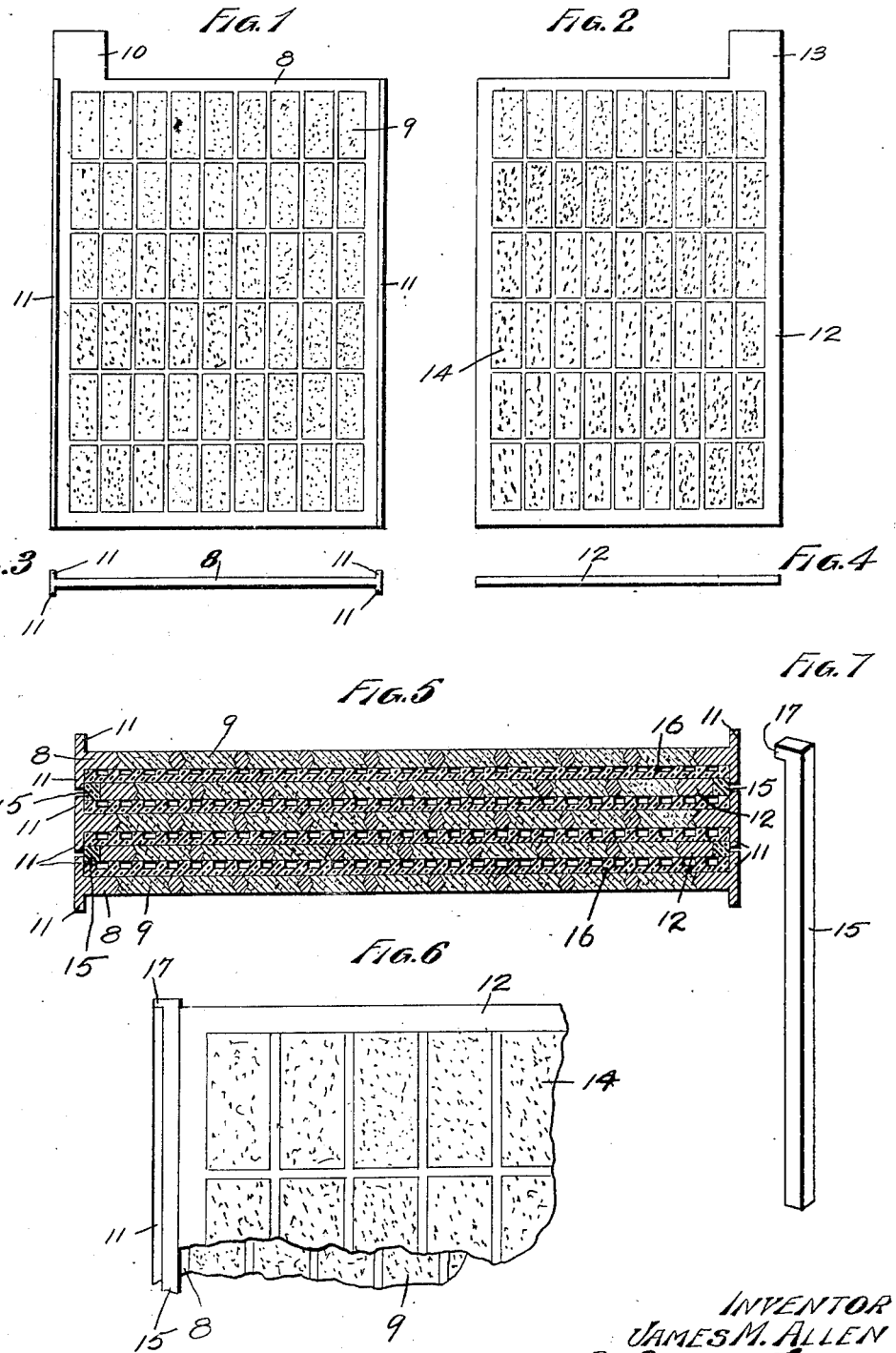
INVENTOR
JAMES M. ALLEN
BY Edward C. Lingan
ATTY.

Patented Feb. 17, 1925.

1,526,453

UNITED STATES PATENT OFFICE.

JAMES M. ALLEN, OF ST. LOUIS, MISSOURI, ASSIGNOR TO JAMES M. ALLEN, FRED P. SMITH, AND FREDERICK D. TUCKER, TRUSTEES.

STORAGE BATTERY.

Application filed May 15, 1922. Serial No. 560,884.

*To all whom it may concern:*

Be it known that I, JAMES M. ALLEN, a citizen of the United States, and resident of the city of St. Louis, and State of Missouri, have invented certain new and useful Improvements in Storage Batteries, of which the following is a specification, containing a full, clear, and exact description, reference being had to the accompanying drawings, forming a part hereof.

My invention relates to improvements in storage batteries, and has for its primary object a storage battery which is so constructed as to reduce the possibility of buckling of the positive plates.

A further object is to construct a storage battery in which the vertical edges of the positive plates are reinforced or stiffened, so as to prevent their buckling when a great strain is placed on the battery.

In the drawings,

Fig. 1 a side elevation of one of the positive plates made use of.

Fig. 2 a similar view of one of the negative plates.

Fig. 3 a bottom plan view of the positive plate.

Fig. 4 a bottom plan view of the negative plate.

Fig. 5 an enlarged horizontal section of a number of positive and negative plates as they appear when assembled in the cell.

Fig. 6 an enlarged fragmental view, showing the manner in which the side shifting of the negative plates is prevented.

Fig. 7 a perspective view of one of the insulating strips made use of to prevent side shifting.

In the construction of my device I employ a positive plate 8, which is of the usual grid formation and which contains active material 9. This plate is provided with the usual lug 10 for attaching it to a crow's foot. Along the vertical edges of the plate 8, and extending on either side thereof is a rib 11, which makes the plate substantially I-shaped in form. The negative plate consists of the ordinary grid 12 which is provided with a lug or projection 13 for securing it to a crow's foot, and with the active material 14.

It will be noted that the width of the plate 12 is less than the plate 8, so that it will fit between the ribs 11 and still allow sufficient space for the insulating strips 15 to be inserted. These strips are inserted as shown in Fig. 5, and effectually prevent side shifting of the plates 12. In assembling the plates, the ordinary separators 16 are made use of to space the positive and negative plates apart. The insulating strips 15 are provided on their upper ends with a projection 17, which is adapted to rest on the ribs 11, and prevent them from slipping downward into the battery jar. The strips 15 extend the full length of the rib, so that there is no chance of the active material which naturally plugs off from the plates, all causing a short circuit by lodging between the vertical edges of the negative plate 12 and the ribs 11. This would be possible were the strips 15 not held by the projection 17. It has been found in actual practice, that it is always the positive plate of a storage battery which buckles when undue or sudden strain is placed on the battery, and by supplying the stiffening ribs on either side of the plate and along the vertical edges thereof, this buckling tendency is eliminated.

While I have shown the ribs 11 spaced apart when the battery plates are assembled, as in Fig. 5, this feature is not essential, as the ribs may be made heavy enough to contact without destroying the utility of the battery, since all the plates are connected together by the crow's foot. In accidental contact of the positive plates, the ribs thereon will not interfere with the working of the battery in the least.

Having fully described my invention, what I claim is:

1. A storage battery comprising a plurality of positive plates having stiffening ribs formed integral with their vertical edges, a plurality of negative plates, separators interposed between the positive and negative plates and insulators interposed between the ribs of the positive plates and the vertical edges of the negative plates.

2. A storage battery comprising a plurality of positive plates integral stiffening ribs formed along the vertical edges of said plates, a plurality of negative plates, separators interposed between the positive and negative plates and means for preventing the contact of the vertical edges of the negative plates with the stiffening ribs of the positive plates.

3. The storage battery of claim 2, in which the insulating strips are provided with a projection which hooks over the ribs of the positive plates.

In testimony whereof, I have signed my name to this specification.

JAMES M. ALLEN.